(12) United States Patent
Mesropian et al.

(10) Patent No.: US 9,219,707 B1
(45) Date of Patent: Dec. 22, 2015

(54) SYSTEMS AND METHODS FOR SHARING THE RESULTS OF MALWARE SCANS WITHIN NETWORKS

(71) Applicant: Symantec Corporation, Mountain View, CA (US)

(72) Inventors: Haik Mesropian, Glendale, CA (US); Wesley Jordan, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 13 days.

(21) Appl. No.: 13/926,064

(22) Filed: Jun. 25, 2013

(51) Int. Cl.
*G06F 12/12* (2006.01)
*G06F 12/14* (2006.01)
*H04L 29/06* (2006.01)
*G06F 21/57* (2013.01)

(52) U.S. Cl.
CPC .............. *H04L 63/00* (2013.01); *G06F 21/577* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 8,667,593 B1 * | 3/2014 | Shnitzer | 726/24 |
| 2002/0129047 A1 * | 9/2002 | Cane et al. | 707/204 |
| 2004/0153644 A1 * | 8/2004 | McCorkendale et al. | 713/156 |
| 2007/0150948 A1 * | 6/2007 | De Spiegeleer | 726/22 |
| 2008/0256636 A1 * | 10/2008 | Gassoway | 726/24 |
| 2009/0320133 A1 * | 12/2009 | Viljoen et al. | 726/24 |
| 2010/0169972 A1 * | 7/2010 | Kuo et al. | 726/23 |

* cited by examiner

*Primary Examiner* — Fatoumata Traore
(74) *Attorney, Agent, or Firm* — ALG Intellectual Property, LLC

(57) ABSTRACT

A computer-implemented method for sharing the results of malware scans within networks may include (1) identifying a set of files stored on a set of client devices within a network, (2) obtaining a set of copies of the files stored on the client devices within the network, (3) performing a malware scan on the copies of the files, (4) generating a result of the malware scan performed on the copies of the files, and then (5) sharing the result of the malware scan with at least a subset of the client devices within the network to enable the subset of client devices to use the result of the malware scan instead of each performing an additional malware scan that is at least partially redundant to the malware scan performed on the copies of the files. Various other methods, systems, and computer-readable media are also disclosed.

19 Claims, 7 Drawing Sheets

SYSTEMS AND METHODS FOR SHARING THE RESULTS OF MALWARE SCANS WITHIN NETWORKS

BACKGROUND

Client devices within a network environment often perform malware scans that are at least partially redundant to one another. For example, a client device within a network may perform a malware scan on various files stored on the client device. Similarly, another client device within the same network may perform the same malware scan on one or more identical files stored on the other client device. Unfortunately, these malware scans may cause such devices to consume limited resources (e.g., processing power or battery life) and/or suffer temporary performance degradation.

What is needed, therefore, are systems and methods for sharing the results of malware scans among client devices within a network to reduce or eliminate redundancy in malware scanning and/or preserve resources within the network.

SUMMARY

As will be described in greater detail below, the instant disclosure generally relates to systems and methods for sharing the results of malware scans within networks by performing the malware scans at a server and then enabling client devices within the networks to access the results of the malware scans.

In one example, a computer-implemented method for sharing the results of malware scans within networks may include (1) identifying a set of files stored on a set of client devices within a network, (2) obtaining a set of copies of the files stored on the client devices within the network, (3) performing a malware scan on the copies of the files, (4) generating a result of the malware scan performed on the copies of the files, and then (5) sharing the result of the malware scan with at least a subset of the client devices within the network to enable the subset of client devices to use the result of the malware scan instead of each performing an additional malware scan that is at least partially redundant to the malware scan performed on the copies of the files.

In some examples, the method may also include obtaining a set of client-side lists that include hashes identifying the files stored on the client devices within the network. In such examples, the method may further include determining that the server has not yet obtained a copy of a file stored on at least one client device within the set of client devices within the network based at least in part on at least one client-side list within the set of client-side lists. In addition, the method may include obtaining the copy of the file (from, e.g., the client device storing the file or a backup server that has backed up the client device storing the file) in response to determining that the server has not yet obtained the copy of the file.

In some examples, the method may also include identifying a server-side list that includes a set of hashes that uniquely identify each file already obtained by the server. In such examples, the method may further include determining that the server has not yet obtained the copy of the file stored on the client device by comparing the client-side list with the server-side list.

In some examples, the method may also include scanning the copies of the files with at least one malware definition. In such examples, the method may further include obtaining a security update that includes at least one additional malware definition and performing an updated malware scan by scanning the copies of the files with the additional malware definition.

In some examples, the method may also include withholding the security update from at least a subset of the client devices within the network until the server has finished performing the updated malware scan. In such examples, the method may further include providing the security update to the subset of client devices after the server has finished performing the updated malware scan.

In some examples, the method may also include providing the result of the malware scan to the subset of client devices. Additionally or alternatively, the method may include facilitating access by the subset of client devices to the result of the malware scan.

In some examples, the method may also include identifying at least one singleton file that is unique to a single client device within the network. In such examples, the method may further include skipping the singleton file when obtaining the copies of the files stored on the client devices since the singleton file is unique to the single client device within the network.

In one embodiment, a system for implementing the above-described method may include (1) an identification module that identifies a set of files stored on a set of client devices within a network, (2) an obtainment module that obtains a set of copies of the files stored on the client devices within the network, (3) a security module that (a) performs a malware scan on the copies of the files and (b) generates a result of the malware scan performed on the copies of the files, and (4) a sharing module that shares the result of the malware scan with at least a subset of the client devices within the network to enable the subset of client devices to use the result of the malware scan instead of each performing an additional malware scan that is at least partially redundant to the malware scan performed on the copies of the files. The system may also include at least one processor configured to execute the identification module, the obtainment module, the security module, and the sharing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a set of files stored on a set of client devices within a network, (2) obtain a set of copies of the files stored on the client devices within the network, (3) perform a malware scan on the copies of the files, (4) generate a result of the malware scan performed on the copies of the files, and then (5) share the result of the malware scan with at least a subset of the client devices within the network to enable the subset of client devices to use the result of the malware scan instead of each performing an additional malware scan that is at least partially redundant to the malware scan performed on the copies of the files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
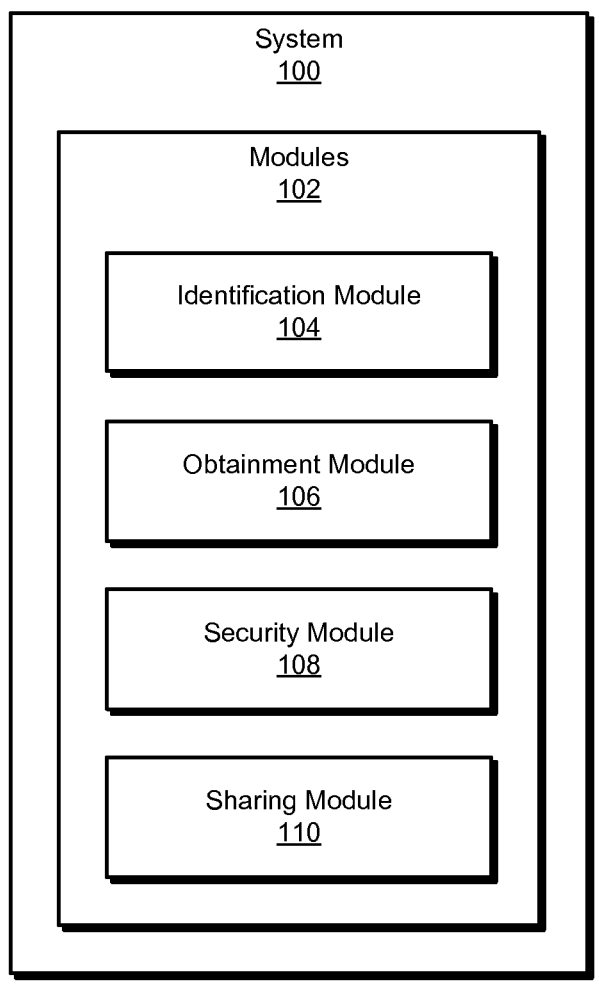
FIG. 1 is a block diagram of an exemplary system for sharing the results of malware scans within networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for sharing the results of malware scans within networks. As will be explained in greater detail below, by obtaining a set of copies of files stored on client devices within a network, the various systems and methods described herein may perform a malware scan on the copies of the files and distribute at least one result of the malware scan to the client devices within the network.

By performing the malware scan on the copies of the files and distributing the result to the client devices within the network, the various systems and methods described herein may facilitate sharing the result among the client devices within the network to eliminate (or at least reduce) redundancy in malware scanning and/or preserve resources (such as processing power and/or battery life of the client devices) within the network. In other words, by facilitating sharing the result among the client devices within the network, the various systems and methods described herein may eliminate the need for (or at least reduce the frequency or extent of) malware scanning at the client level.

Figure 2:
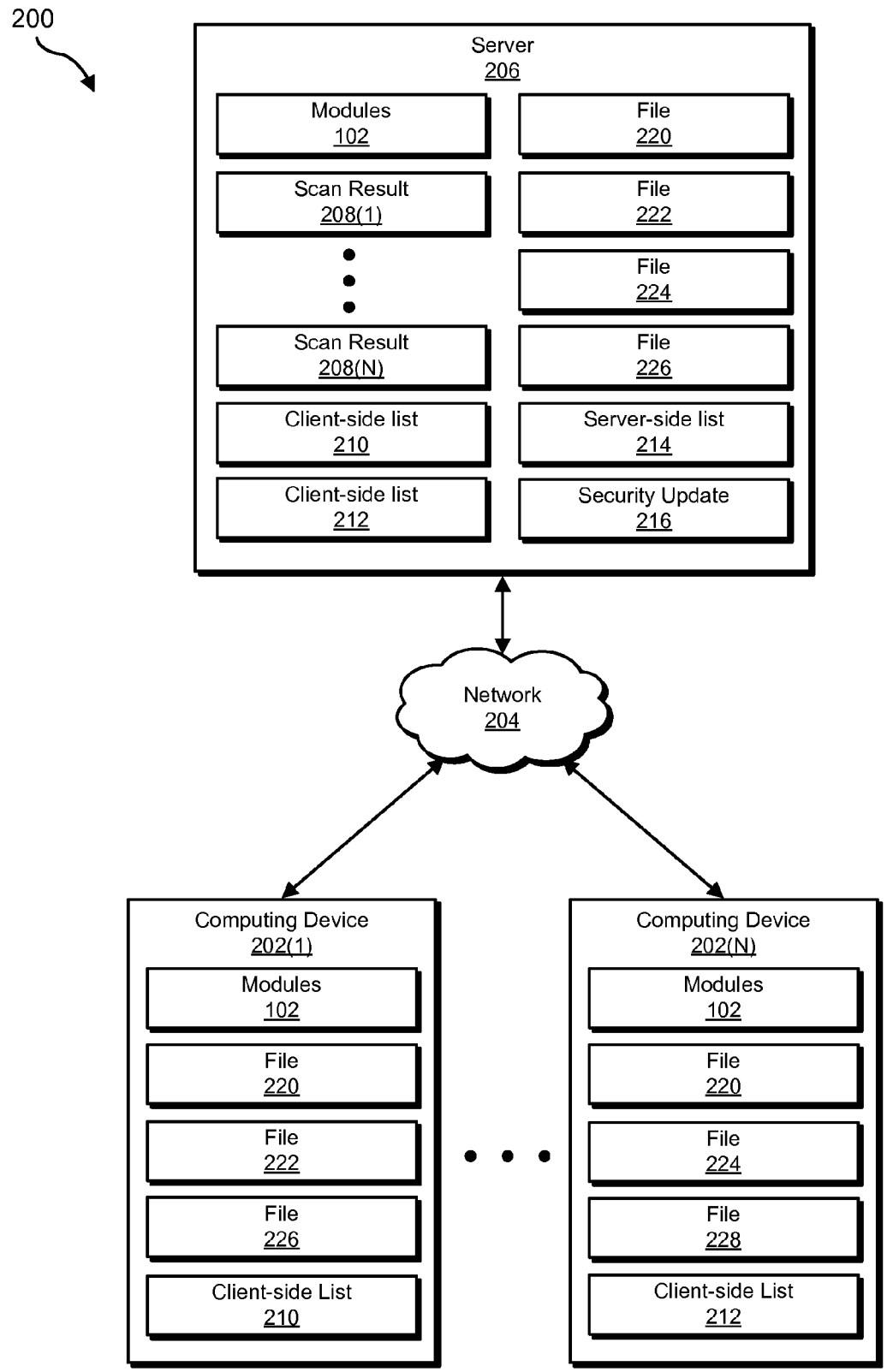
FIG. 2 is a block diagram of an exemplary system for sharing the results of malware scans within networks.

The following will provide, with reference to FIGS. 1-2, detailed descriptions of exemplary systems for sharing the results of malware scans within networks. Detailed descriptions of corresponding computer-implemented methods will be provided in connection with FIG. 3. Detailed descriptions of exemplary client-side lists that identify files stored on client devices within a network will be provided in connection with FIG. 4. Detailed descriptions of an exemplary server-side list that identifies files obtained by a server within a network will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for sharing the results of malware scans within networks. As illustrated in this figure, exemplary system 100 may include one or more modules 102 for performing one or more tasks. For example, and as will be explained in greater detail below, exemplary system 100 may include an identification module 104 that identifies a set of files stored on a set of client devices within a network. Exemplary system 100 may also include an obtainment module 106 that obtains a set of copies of the files stored on the client devices within the network.

In addition, and as will be described in greater detail below, exemplary system 100 may include a security module 108 that performs a malware scan on the copies of the files and generates a result of the malware scan. Exemplary system 100 may further include a sharing module 110 that shares the result of the malware scan with at least a subset of the client devices within the network to enable the client devices to use the result of the malware scan instead of each performing an additional malware scan. Although illustrated as separate elements, one or more of modules 102 in FIG. 1 may represent portions of a single module or application (such as SYMANTEC ENDPOINT PROTECTION, KASPERSKY ENDPOINT SECURITY, BITDEFENDER BUSINESS PACK, F-SECURE BUSINESS SUITE, G DATA ANTIVIRUS BUSINESS, WEBROOT SECURE ANYWHERE BUSINESS, or VIPRE BUSINESS PREMIUM).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 may also include one or more databases (not illustrated in FIG. 1). In one example, a database may be configured to store any data and/or information used to facilitate sharing the results of malware scans among client devices within a network. For example, the database may store a set of files and/or a set of copies of the files. Additionally or alternatively, the database may store one or more results of a malware scan performed on such files.

Such a database may represent portions of a single database or computing device or a plurality of databases or computing devices. For example, the database may represent a portion of one or more of computing devices 202(1)-(N) and/or server 206 in FIG. 2, computing system 610 in FIG. 6, and/or portions of exemplary network architecture 700 in FIG. 7. Alternatively, the database may represent one or more physically separate devices capable of being accessed by a computing device, such as computing device 202(1), computing device 202(N), and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102. Additionally or alternatively, server 206 may be programmed with one or more of modules 102.

In one embodiment, one or more of modules 102 from FIG. 1 may, when executed by at least one processor of at least one of computing devices 202(1)-(N) or server 206, facilitate at least one of computing devices 202(1)-(N) and/or server 206 in sharing the results of malware scans within networks. For example, and as will be described in greater detail below, one or more of modules 102 may cause at least one of computing devices 202(1)-(N) and/or server 206 to (1) identify a set of files 218 stored on computing devices 202(1)-(N) within a network, (2) obtain a set of copies 230 of the files stored on computing devices 202(1)-(N) within the network, (3) perform a malware scan on set of copies 230, (4) generate one or more results 208(1)-(N) of the malware scan performed on set of copies 230, and then (5) share one or more of results 208(1)-(N) with one or more of computing devices 202(1)-(N) within the network to enable the one or more of computing devices 202(1)-(N) to use the one or more of results 208(1)-(N) instead of each performing an additional malware scan that is at least partially redundant to the malware scan performed on set of copies 230.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device capable of performing malware scans and/or facilitating sharing the results of such malware scans within networks. Examples of server 206 include, without limitation, application servers, web servers, storage servers, security servers, and/or database servers configured to run certain software applications and/or provide various web, storage, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
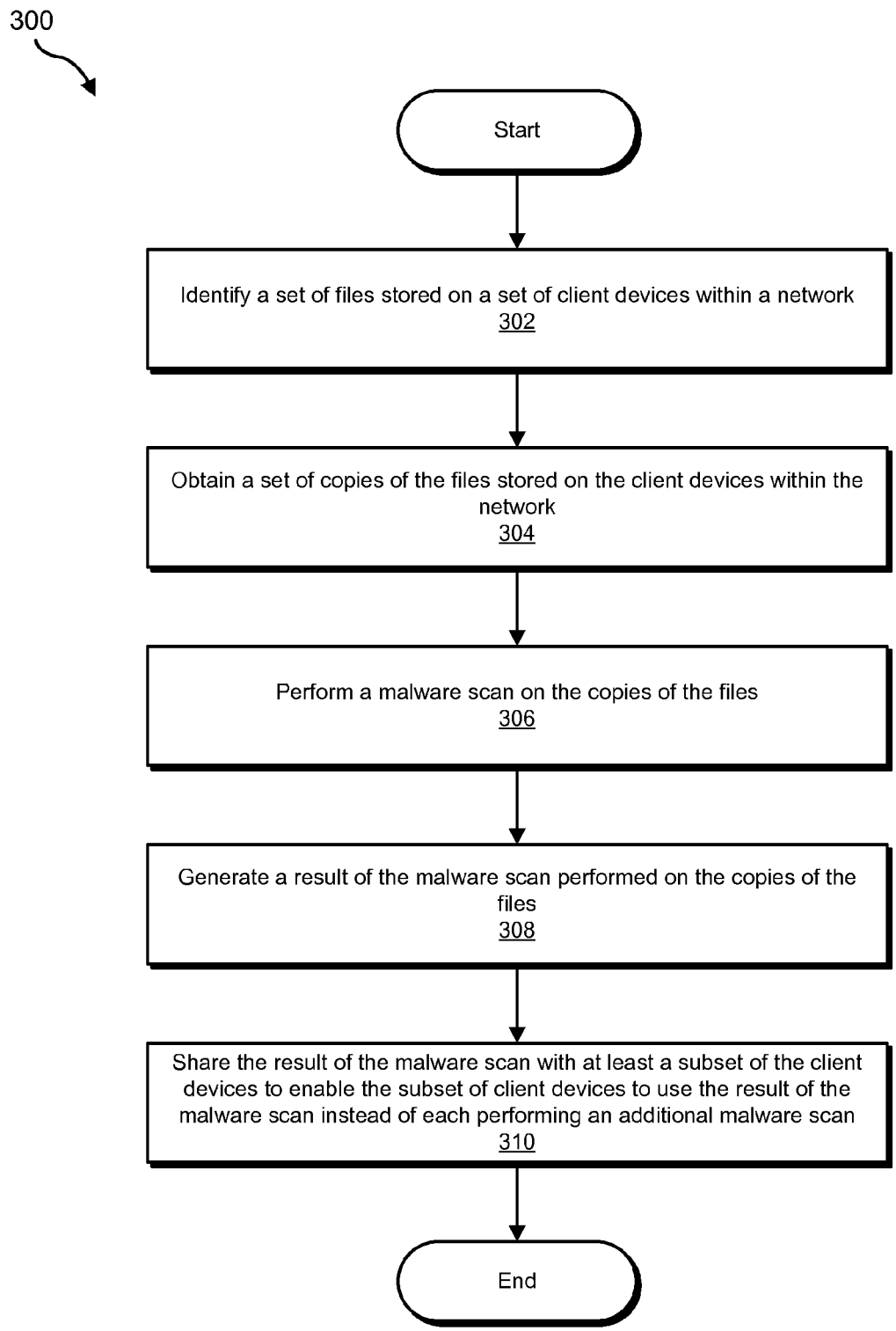
FIG. 3 is a flow diagram of an exemplary method for sharing the results of malware scans within networks.

FIG. 3 is a flow diagram of an exemplary computer-implemented method 300 for sharing the results of malware scans within networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a set of files stored on a set of client devices within a network. For example, at step 302 identification module 104 may, as part of computing devices 202(1)-(N) and/or server 206 in FIG. 2, identify set of files 218 stored on computing devices 202(1)-(N) within a network. In this example, set of files 218 may include each file stored on at least one of computing devices 202(1)-(N) within the network.

The systems described herein may perform step 302 in a variety of ways. In one example, identification module 104 may query computing devices 202(1)-(N) to determine which files are stored on computing devices 202(1)-(N). For example, identification module 104 may direct server 206 to send a request for a listing of files to each of computing devices 202(1)-(N) via network 204. In this example, each of computing devices 202(1)-(N) may receive the request from server 206 via network 204.

Upon receiving the request from server 206, each of computing devices 202(1)-(N) may identify or generate a corresponding listing of files in an effort to satisfy the request. For example, computing device 202(1) may generate a set of hashes that uniquely identify each of files 220, 222, and 226 stored on computing device 202(1). Computing device 202(1) may then compile this set of hashes into client-side list 210.

Figure 4:
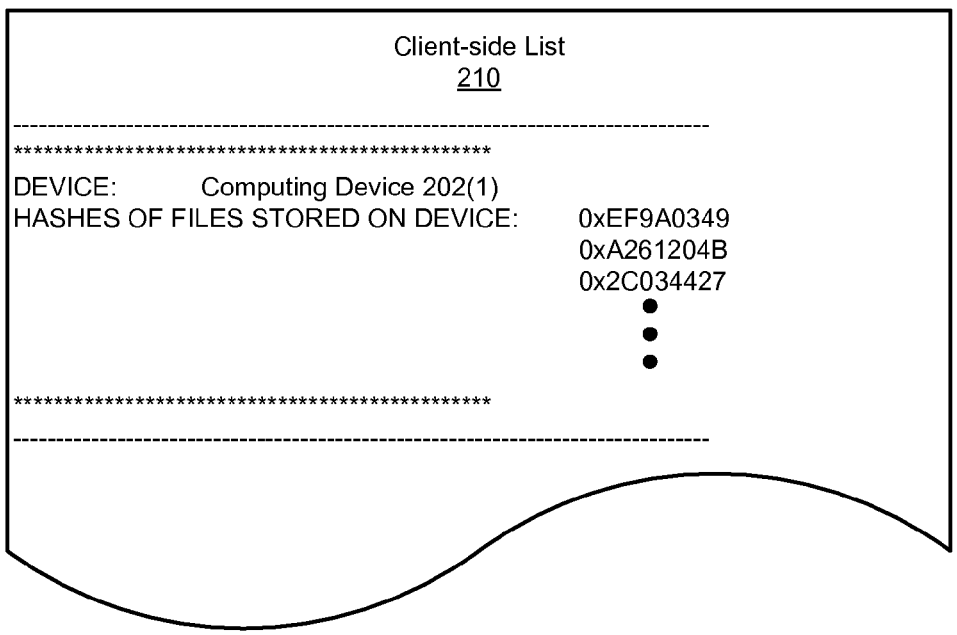
FIG. 4 is an illustration of exemplary client-side lists that identify files stored on client devices within a network.
Figure 4:
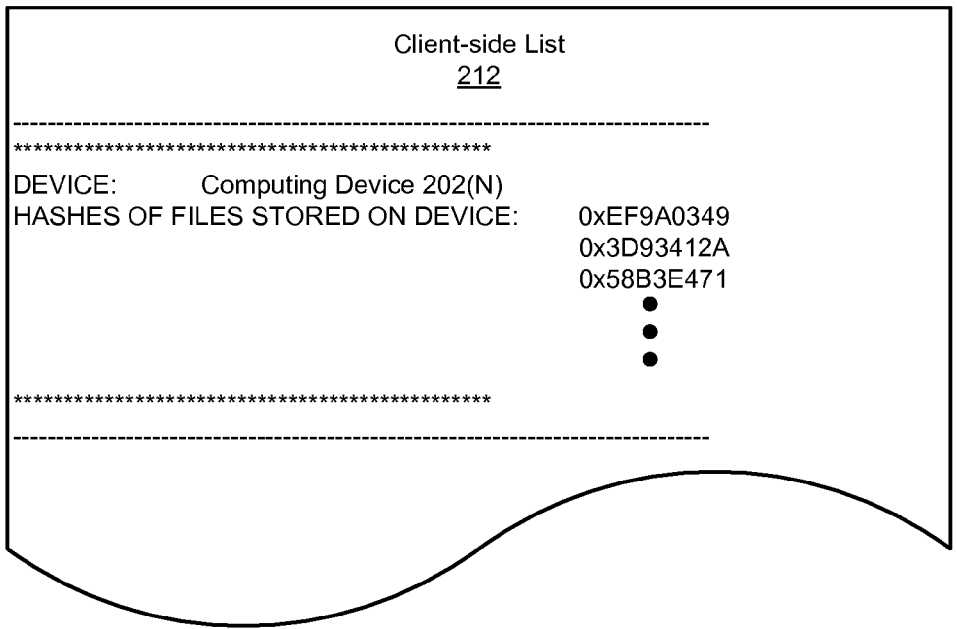

As illustrated in FIG. 4, client-side list 210 may include information that identifies the originating device (in this example, "Computing Device 202(1)") and a set of hashes that uniquely identify each of the files stored on the originating device (in this example, "0xEF9A0349," "0xA261204B," "0x2C034427," and so on). In one example, the "0xEF9A0349" hash may uniquely identify file 220, the "0xA261204B" hash may uniquely identify file 222, and the "0x2C034427" hash may uniquely identify file 226.

Additionally or alternatively, computing device 202(N) may generate a set of hashes that uniquely identify each of files 220 and 224 as well as singleton file 228 stored on computing device 202(N). Computing device 202(N) may then compile this set of hashes into client-side list 212.

As further illustrated in FIG. 4, client-side list 212 may include information that identifies the originating device (in this example, "Computing Device 202(N)") and a set of hashes that uniquely identify each of the files stored on the originating device (in this example, "0xEF9A0349," "0x3D93412A," "0x58B3E471," and so on). In one example, the "0xEF9A0349" hash may uniquely identify file 220, the "0x3D93412A" hash may uniquely identify file 224, and the "0x58B3E471" hash may uniquely identify singleton file 228.

Upon identifying or generating the corresponding listing of files, each of computing devices 202(1)-(N) may send the listing of files to server 206. For example, computing device 202(1) may send client-side list 210 to server 206 via network 204. Similarly, computing device 202(N) may send client-side list 212 to server 206 via network 204. Server 206 may then receive client-side list 210 from computing device 202(1) and client-side list 212 from computing device 202(N) via network 204.

As server 206 receives client-side lists 210 and 212, identification module 104 may identify client side-lists 210 and 212 and then determine set of files 218 based at least in part on client-side lists 210 and 212. For example, identification module 104 may analyze client-side list 210 and identify the set of hashes that uniquely identify each of files 220, 222, and 226 during this analysis. Similarly, identification module 104 may analyze client-side list 212 and identify the set of hashes that uniquely identify each of files 220 and 224 as well as singleton file 228 during this analysis. Identification module 104 may then determine that set of files 218 stored on computing devices 202(1)-(N) includes files 220, 222, 224, and 226 as well as singleton file 228.

In another example, identification module 104 may query a backup server (not illustrated in FIG. 2) that has backed up computing devices 202(1)-(N) to determine which files are stored on computing devices 202(1)-(N). For example, identification module 104 may direct server 206 to send a request for a listing of files stored on computing devices 202(1)-(N) to the backup server via network 204. In this example, the backup server may receive the request from server 206 via network 204.

Upon receiving the request from server 206, the backup server may identify or generate a listing of files backed up to the backup server from computing devices 202(1)-(N) in an effort to satisfy the request. For example, the backup server may generate a set of hashes that uniquely identify each of files 220, 222, 224, and 226 as well as singleton file 228 stored on computing devices 202(1)-(N). The backup server may then compile this set of hashes into a listing of backup files that have been backed up to the backup server from computing devices 202(1)-(N).

Upon identifying or generating the listing of backup files, the backup server may send the listing of backup files to server 206 via network 204. Server 206 may then receive the listing of backup files from the backup server via network 204.

As server 206 receives the listing of backup files, identification module 104 may identify the listing of backup files and then determine set of files 218 based at least in part on the listing of backup files. For example, identification module 104 may analyze the listing of backup files and identify the set of hashes that uniquely identify each of files 220, 222, 224, and 226 as well as singleton file 228 during this analysis. Identification module 104 may then determine that set of files 218 stored on computing devices 202(1)-(N) includes files 220, 222, 224, and 226 as well as singleton file 228.

As illustrated in FIG. 3, at step 304 one or more of the systems described herein may obtain a set of copies of the files stored on the client devices within the network. For example, at step 304 obtainment module 106 may, as part of server 206 in FIG. 2, obtain set of copies 230 of the files stored on computing devices 202(1)-(N) within the network. In this example, set of copies 230 may include a copy of each file that is stored on a plurality of computing devices 202(1)-(N) but exclude any singleton files that are found on only one device within computing devices 202(1)-(N).

The systems described herein may perform step 304 in a variety of ways. In one example, obtainment module 106 may seek a single copy of each file within set of files 218 stored on a plurality of computing devices 202(1)-(N). For example, obtainment module 106 may identify the "0xEF9A0349" hash, the "0xA261204B" hash, and the "0x2C034427" hash in a plurality of client-side lists (even though the "0xA261204B" hash and the "0x2C034427" hash are only shown in a single client-side list in FIG. 4). In this example, since obtainment module 106 was able to identify the "0xEF9A0349" hash, the "0xA261204B" hash, and the "0x2C034427" hash in a plurality of client-side lists, obtainment module 106 may determine that each file uniquely identified by these hashes is stored on a plurality of computing devices 202(1)-(N).

Upon determining that each file uniquely identified by these hashes is stored on a plurality of computing devices 202(1)-(N), obtainment module 106 may obtain each file uniquely identified by these hashes from any device that includes a copy of the file. For example, obtainment module 106 may direct server 206 to send a request for the files uniquely identified by the "0xEF9A0349" hash, the "0xA261204B" hash, and the "0x2C034427" hash to computing device 202(1) via network 204. In this example, computing device 202(1) may receive the request from server 206 via network 204 and then satisfy the request by sending a copy of file 220, a copy of file 222, and a copy of file 226 to server 206 via network 204.

In one example, server 206 may receive the copies of files 220, 222, and 226 from computing device 202(1) via network 204. In this example, as server 206 receives the copies of files 220, 222, and 226 from computing device 202(1), obtainment module 106 may obtain the copies of files 220, 222, and 226 and then add the same to set of copies 230.

Additionally or alternatively, obtainment module 106 may direct server 206 to send a request for the files uniquely identified by the "0xEF9A0349" hash, the "0xA261204B" hash, and the "0x2C034427" hash to the backup server (not illustrated in FIG. 2) via network 204. In this example, the backup server may receive the request from server 206 via network 204 and then satisfy the request by sending a copy of file 220, a copy of file 222, and a copy of file 226 to server 206 via network 204.

In one example, server 206 may receive the copies of files 220, 222, and 226 from the backup server via network 204. In this example, as server 206 receives the copies of files 220, 222, and 226 from the backup server, obtainment module 106 may obtain the copies of files 220, 222, and 226 and then add the same to set of copies 230.

Additionally or alternatively, obtainment module 106 may identify the "0x3D93412A" hash in a plurality of client-side lists (even though this hash is only shown in a single client-side list in FIG. 4). Since obtainment module 106 was able to identify the "0x3D93412A" hash in a plurality of client-side lists, obtainment module 106 may determine that the file uniquely identified by the "0x3D93412A" hash is stored on a plurality of computing devices 202(1)-(N).

In one example, obtainment module 106 may also determine that server 206 has not yet obtained a copy of the file uniquely identified by the "0x3D93412A" hash. For example, obtainment module 106 may identify server-side list 214 that identifies each file already obtained by server 206. In this example, obtainment module 106 may compare the "0x3D93412A" hash with server-side list 214. Obtainment module 106 may then determine that server 206 has not yet obtained a copy of the file uniquely identified by the "0x3D93412A" hash upon failing to find the "0x3D93412A" hash in server-side list 214 during this comparison.

Figure 5:
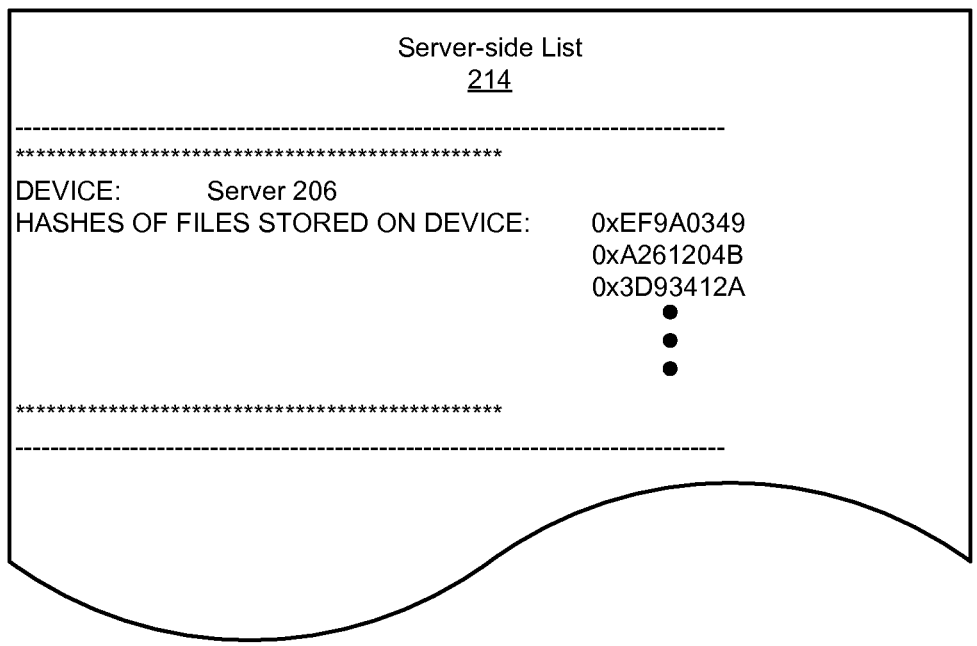
FIG. 5 is an illustration of an exemplary server-side list that identifies files obtained by a server within a network.

As illustrated in FIG. 5, server-side list 214 may include information that identifies the originating device (in this example, "Server 206") and the set of hashes that uniquely identify each of the files stored on the originating device (in this example, "0xEF9A0349," "0xA261204B," "0x2C034427," and so on). In one example, and as indicated above in connection with client-side list 210 illustrated in FIG. 4, the "0xEF9A0349" hash may uniquely identify file 220, the "0xA261204B" hash may uniquely identify file 222, and the "0x2C034427" hash may uniquely identify file 226.

Upon determining that the file uniquely identified by the "0x3D93412A" hash is stored on a plurality of computing devices 202(1)-(N) but server 206 has not yet obtained a copy of this file, obtainment module 106 may obtain this file from any device that includes a copy of this file. For example, obtainment module 106 may obtain a copy of file 224 by using the "0x3D93412A" hash in any of the ways described above in connection with the "0xEF9A0349" hash, the "0xA261204B" hash, and the "0x2C034427" hash. Obtainment module 106 may then add the copy of file 224 to set of copies 230.

Additionally or alternatively, obtainment module 106 may identify the "0x58B3E471" hash in only a single client-side list. For example, obtainment module 106 may identify the "0x58B3E471" hash in only client-side list 212 obtained from computing devices 202(N). In this example, since obtainment module 106 was able to identify the "0x58B3E471" hash in only client-side list 212 obtained from computing device 202(N), obtainment module 106 may determine that the file uniquely identified by the "0x58B3E471" hash is a singleton unique to computing device 202(N) within the network.

Upon determining that that the file uniquely identified by the "0x58B3E471" hash is a singleton unique to computing device 202(N), obtainment module 106 may skip over the singleton file when obtaining set of copies 230. For example, obtainment module 106 may elect to not obtain singleton file 228 stored on computing device 202(N) since singleton file 228 is unique to computing device 202(N) within the network. By electing to not obtain singleton file 228, obtainment module 106 may help preserve the limited resources of server 206 by focusing the malware scanning at the server level on only those files found on a plurality of computing devices 202(1)-(N) within the network.

As illustrated in FIG. 3, at step 306 one or more of the systems described herein may perform a malware scan on the copies of the files. For example, at step 306 security module 108 may, as part of server 206 in FIG. 2, perform a malware scan on set of copies 230. Examples of the malware scan include, without limitation, reputation-based malware scans, heuristic-based malware scans, definition-based (or signature-based) malware scans, deterministic malware scans, combinations of one or more of the same, and/or any other suitable malware scans.

The systems described herein may perform step 306 in a variety of ways. In one example, security module 108 may identify at least one malware definition and then scan set of copies 230 with the malware definition. The phrase "malware definition," as used herein, generally refers to any type or form of rule, expression, trigger, policy, pattern, activity, algorithm, or hash that uniquely identifies or otherwise suggests a specific type or form of malware.

In one example, security module 108 may obtain a security update that includes at least one additional malware definition. For example, security module 108 may receive a notification indicating that security update 216 has been released by the corresponding security software vendor. In this example, security module 108 may direct server 206 to download security update 216 from the security software vendor's server (not illustrated in FIG. 2) via the Internet. As server 206 downloads security update 216, security module 108 may obtain security update 216 and then perform an updated malware scan on set of copies 230 by scanning set of copies 230 with at least one additional malware definition included in security update 216.

In one example, security module 108 may initiate a process to ensure that set of copies 230 includes each file currently stored on a plurality of computing devices 202(1)-(N) prior to performing the updated malware scan. For example, security module 108 may direct identification module 104 to identify each file currently stored on computing devices 202(1)-(N) in response to security update 216. In this example, security module 108 may also direct obtainment module 106 to obtain any files currently stored on a plurality of computing devices 202(1)-(N) but not included in set of copies 230 and then add such files to set of copies 230 prior to performing the updated malware scan. Identification module 104 and obtainment module 106 may identify and obtain the corresponding files in any of the ways described above in connection with steps 302 and 304.

In one example, computing devices 202(1)-(N) may each include security software that monitors the computing health of computing devices 202(1)-(N) at the client level. In this example, the security software may invalidate the result(s) of all previous malware scans stored on computing devices 202(1)-(N) upon receiving a security update that includes at least one new malware definition. As a result, the security software may have a need to perform an updated malware scan with the new malware definition to ensure that computing devices 202(1)-(N) do not include any type or form of malware identified by the new malware definition.

In one example, security module 108 may direct server 206 to withhold the security update from one or more of computing devices 202(1)-(N) until security module 108 has finished performing the updated malware scan at the server level. By directing server 206 to withhold the security update until security module 108 has finished performing the updated malware scan, security module 108 may prevent the security software installed on computing devices 202(1)-(N) from invalidating the result(s) of all previous malware scans and initiating redundant and/or unnecessary malware scanning at the client level. Security module 108 may later direct server 206 to provide the security update to one or more of computing devices 202(1)-(N) after security module 108 has finished performing the updated malware scan at the server level.

As illustrated in FIG. 3, at step 308 one or more of the systems described herein may generate at least one result of the malware scan performed on the copies of the files. For example, at step 308 security module 108 may, as part of server 206 in FIG. 2, generate results 208(1)-(N) of the malware scan performed on set of copies 230. Examples of scan results 208(1)-(N) include, without limitation, information that identifies a specific type or form of malware detected in at least one file, the trustworthiness of at least one file, a confidence level for a trustworthiness classification assigned to at least one file, a warning or concern about at least one file, an indication of the exoneration of at least one file, combinations of one or more of the same, and/or any other suitable results of a malware scan.

The systems described herein may perform step 308 in a variety of ways. In one example, while performing the malware scan on set of copies 230, security module 108 may detect at least one type or form of malware. For example, while performing the malware scan on set of copies 230, security module 108 may apply the malware definition to file 220. In this example, upon applying the malware definition to file 220, security module 108 may determine that file 220 includes a type or form of malware identified by the malware definition. Security module 108 may then generate scan result 208(1) that indicates that file 220 includes the type or form of malware identified by the malware definition.

In another example, while performing the malware scan on set of copies 230, security module 108 may determine that a file is clean (e.g., uninfected). For example, security module 108 may apply each available malware definition to file 222. In this example, after having applied each available malware definition to file 222, security module 108 may determine that file 222 is clean since file 222 did not include any type or form of malware identified by any available malware definition. Security module 108 may then generate scan result 208(N) that indicates that file 222 is clean.

In one example, upon generating scan results 208(1)-(N), security module 108 may store scan results 208(1)-(N) in a database on server 206. In this example, security module 108 may maintain scan results 208(1)-(N) in the database on server 206 to facilitate sharing scan results 208(1)-(N) with computing devices 202(1)-(N) via network 204.

In one example, security module 108 may insert information that identifies the most recent security update in scan results 208(1)-(N). For example, in the event that security module 108 generated scan results 208(1)-(N) immediately after downloading and applying security update 216, security module 108 may insert a timestamp and/or update number indicating that security update 216 is the most recent security update in scan results 208(1)-(N). By inserting such information in scan results 208(1)-(N), security module 108 may help prevent the security software installed on computing devices 202(1)-(N) from invalidating scan results 208(1)-(N) in the event that the security software receives security update 216 after scan results 208(1)-(N).

Security module 108 may organize the results of malware scans in a variety of ways. In one example, security module 108 may generate a scan result that corresponds to a specific computing device within computing devices 202(1)-(N). For example, security module 108 may generate a scan result that identifies each potentially malicious file stored on computing device 202(1). In this example, security module 108 may generate another scan result that identifies each potentially malicious file stored on computing device 202(N).

In another example, security module 108 may generate a scan result that corresponds to a specific malware scan. For example, security module 108 may generate a scan result that identifies each potentially malicious file within set of copies 230 detected during a specific malware scan. In this example, security module 108 may generate another scan result that identifies each potentially malicious file within set of copies 230 detected during an updated malware scan performed after the specific malware scan.

As illustrated in FIG. 3, at step 310 one or more of the systems described herein may share the result of the malware scan with at least a subset of the client devices to enable the subset of client devices to use the result of the malware scan instead of each performing an additional malware scan that is at least partially redundant to the malware scan performed on the copies of the files. For example, at step 310 sharing module 110 may, as part of server 206 in FIG. 2, share one or more of scan results 208(1)-(N) with computing devices 202(1)-(N) to enable computing devices 202(1)-(N) to use the one or more of scan results 208(1)-(N) instead of each performing an additional malware scan. By sharing the one or more of scan results 208 with computing devices 202(1)-(N), sharing module 110 may eliminate the need for (or at least reduce the frequency or extent of) malware scanning at the client level.

The systems described herein may perform step 310 in a variety of ways. In some examples, sharing module 110 may provide the one or more of scan results 208(1)-(N) to computing devices 202(1)-(N). For example, after security module 108 has finished performing the malware scan and generated scan results 208(1)-(N), sharing module 110 may direct server 206 to send the one or more of scan results 208(1)-(N) to each of computing devices 202(1)-(N) via network 204. In this example, each of computing devices 202(1)-(N) may receive the one or more of scan results 208(1)-(N) from server 206 via network 204.

In one example, sharing module 110 may provide a subset of scan results 208(1)-(N) to computing device 202(1) and another subset of scan results 208(1)-(N) to computing device 202(N). For example, in the event that scan result 208(1) corresponds to computing device 202(1) and scan result 208(N) corresponds to computing device 202(N), sharing module 110 may direct server 206 to send scan result 208(1) to computing device 202(1) and scan result 208(N) to computing device 202(N) via network 204. In this example, sharing module 110 may elect to not send scan result 208(1) to computing device 202(N) or scan result 208(N) to computing device 202(1) since scan result 208(1) corresponds to computing device 202(1) and scan result 208(N) corresponds to computing device 202(N).

In some examples, sharing module 110 may make scan results 208(1)-(N) available to computing devices 202(1)-(N). In one example, sharing module 110 may facilitate access to the database that stores scan results 208(1)-(N) on server 206. For example, sharing module 110 may enable computing devices 202(1)-(N) to access the database that stores scan results 208(1)-(N) on server 206 via network 204.

In one example, computing device 202(1) may download a suspicious file via the Internet. In this example, upon downloading the suspicious file, the security software installed on computing device 202(1) may direct computing device 202(1) to send a request for scan results 208(1)-(N) to server 206 via network 204 in case server 206 has already performed a malware scan on a copy of the suspicious file. Server 206 may receive the request from computing device 202(1) via network 204.

As server 206 receives the request from computing device 202(1), sharing module 110 may identify the request and then satisfy the request by providing scan results 208(1)-(N) to computing device 202(1). For example, sharing module 110 may direct server 206 to send scan results 208(1)-(N) to computing device 202(1) via network 204. In this example, computing device 202(1) may receive scan results 208(1)-(N) from server 206 via network 204.

As computing device 202(1) receives scan results 208(1)-(N), the security software installed on computing device 202(1) may identify scan results 208(1)-(N) and then determine whether server 206 has already performed a security scan on a copy of the suspicious file based at least in part on scan results 208(1)-(N). In the event that scan results 208(1)-(N) indicate that server 206 has already performed a malware scan on a copy of the suspicious file, the security software may use scan results 208(1)-(N) to satisfy the need to know whether the suspicious file is clean or infected. By using scan results 208(1)-(N) to satisfy the need to know whether the suspicious file is clean or infected, the security software may avoid performing an additional malware scan that is at least partially redundant to the malware scan performed on set of copies 230 at the server level.

As explained above in connection with method 300 in FIG. 3, a network environment may include various client devices and a server that acts as a repository of the files stored on the client devices and performs malware scanning on behalf of the client devices. In one example, the server may receive a security update that includes at least one new malware definition from the corresponding security software vendor via the Internet. Upon receiving this security update, the server may obtain a list of hashes of the files stored on each client device within the network from the corresponding client device. The server may identify the files stored on each client device within the network based at least in part on these lists of hashes and then obtain a copy of each file stored on multiple client devices that are not yet stored on the server.

Once the server has obtained a copy of each file stored on multiple client devices within the network, the server may scan the copies of the files with at least the new malware definition included in the security update and then generate least one result of the malware scan. Upon finishing the malware scan, the server may provide the result of the malware scan to the client devices within the network to enable the client devices to use the result of the malware scan instead of each performing their own malware scan at the client level.

In one example, since the security update may cause the client devices to invalidate the result(s) of all previous malware scans, the server may withhold the security update from the client devices until finishing the malware scan to prevent the client devices from invalidating the result(s) of all previous malware scans and initiating redundant and/or unnecessary malware scanning at the client level. Once the server has finished the malware scan, the server may push the security update to the client devices to enable the client devices to apply the security update to their client-side security software.

Figure 6:
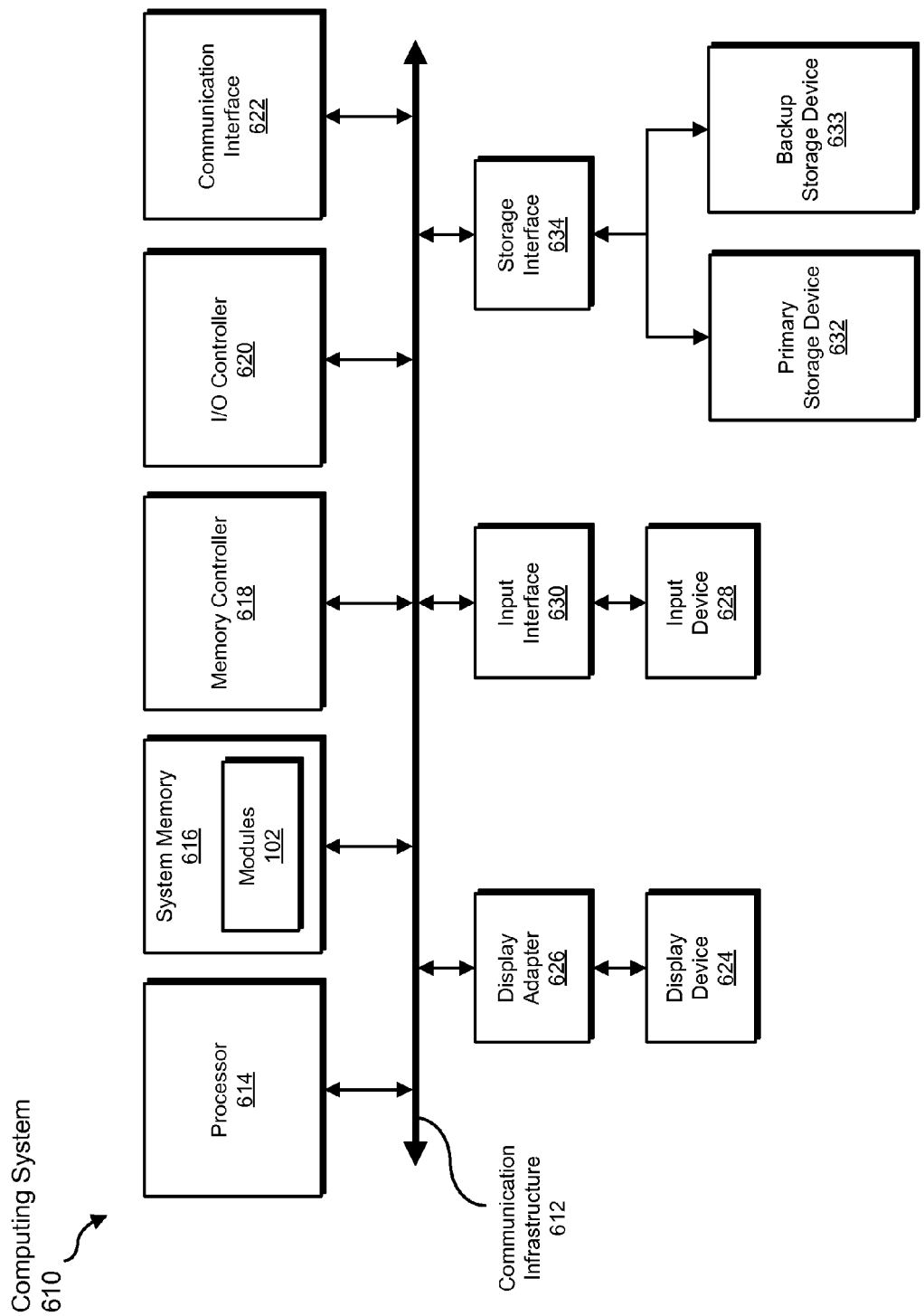
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
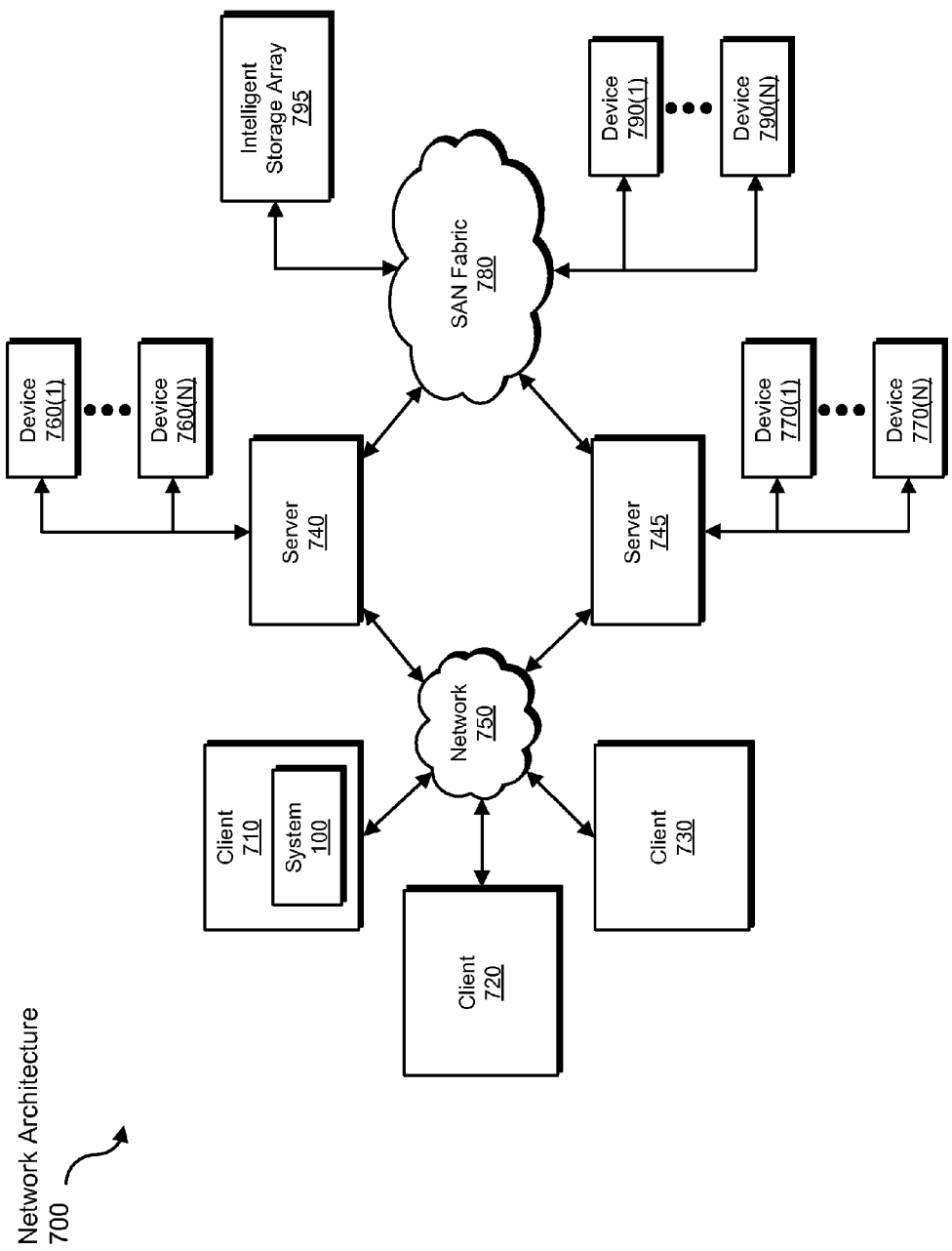
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790

(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for sharing the results of malware scans within networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a copy of a file to be transformed, transform the copy of the file, output a result of the transformation to facilitate sharing the result with client devices within a network, use the result of the transformation to enable the client devices to eliminate (or at least reduce) redundant malware scanning at the client level, and store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sharing the results of malware scans within networks, at least a portion of the method being performed by a computing device comprising at least one processor, the method comprising:
    identifying a set of files stored on a set of client devices within a network;
    obtaining, at a server, a set of copies of the files stored on the client devices within the network;
    upon obtaining the copies of the files stored on the client devices:
        performing a malware scan on the copies of the files using at least one malware definition;
        obtaining a security update that comprises at least one additional malware definition;
        performing an updated malware scan to determine a malware status of each file in the set of files by scanning the copies of the files with the additional malware definition while withholding the security update from at least a subset of the client devices within the network until the server has finished performing the updated malware scan;
        generating a result of the updated malware scan performed on the copies of the files;
    sharing the result of the updated malware scan with at least the subset of the client devices within the network to enable the subset of client devices to use the result of the updated malware scan instead of each performing an additional malware scan that is at least partially redundant to the updated malware scan performed on the copies of the files, wherein sharing the result of the updated malware scan with at least the subset of the client devices comprises sharing, with each client device in the subset, a subset of the result of the updated malware scan that excludes results for files not on the client device;
    forwarding the security update to the subset of client devices from which the security update was withheld after performing the updated malware scan.

2. The method of claim 1, wherein identifying the files stored on the client devices within the network comprises obtaining a set of client-side lists that identify the files stored on the client devices within the network.

3. The method of claim 2, wherein obtaining the copies of the files stored on the client devices within the network comprises:
    determining that the server has not yet obtained a copy of a file stored on at least one client device within the set of client devices based at least in part on at least one client-side list within the set of client-side lists;
    in response to determining that the server has not yet obtained the copy of the file, obtaining the copy of the file.

4. The method of claim 3, wherein obtaining the copy of the file comprises obtaining the copy of the file from the client device storing the file.

5. The method of claim 3, wherein obtaining the copy of the file comprises obtaining the copy of the file from a backup server that has backed up the client device storing the file.

6. The method of claim 3, wherein determining that the server has not yet obtained the copy of the file stored on the client device comprises:
    identifying a server-side list that identifies each file already obtained by the server;
    determining that the server has not yet obtained the copy of the file stored on the client device by comparing the client-side list with the server-side list.

7. The method of claim 6, wherein:
    the client-side list comprises a hash that uniquely identifies the file stored on the client device within the network;
    the server-side list comprises a set of hashes that uniquely identify each file already obtained by the server.

8. The method of claim 1, wherein performing the malware scan on the copies of the files comprises scanning the copies of the files with at least one malware definition.

9. The method of claim 1, wherein sharing the result of the malware scan with the subset of client devices within the network comprises providing the result of the malware scan to the subset of client devices.

10. The method of claim 1, wherein sharing the result of the malware scan with the subset of client devices within the network comprises facilitating access by the subset of client devices to the result of the malware scan.

11. The method of claim 1, wherein obtaining the copies of the files stored on the client devices within the network comprises:
- identifying at least one singleton file that is unique to a single client device within the network;
- skipping the singleton file when obtaining the copies of the files stored on the client devices since the singleton file is unique to the single client device within the network.

12. The computer-implemented method of claim 1, wherein sharing the result of the updated malware scan with at least the subset of client devices comprises sharing a list of potentially malicious files with all client devices within the subset.

13. The computer-implemented method of claim 1, further comprising:
- receiving a request for a malware scan result for a particular file from a client device on the network;
- sending at least a subset of the result of the updated malware scan that comprises the particular file to the client device in response to the request.

14. A system for sharing the results of malware scans within networks, the system comprising:
- an identification module, stored in memory, that identifies a set of files stored on a set of client devices within a network;
- an obtainment module, stored in memory, that obtains, at a server, a set of copies of the files stored on the client devices within the network;
- a security module, stored in memory, that:
- performs a malware scan on the copies of the files using at least one malware definition;
- obtains a security update that comprises at least one additional malware definition;
- performs an updated malware scan to determine a malware status of each file in the set of files by scanning the copies of the files with the additional malware definition while withholding the security update from at least a subset of the client devices within the network until the server has finished performing the updated malware scan;
- generates a result of the updated malware scan performed on the copies of the files;
- a sharing module, stored in memory, that shares the result of the updated malware scan with at least the subset of the client devices within the network to enable the subset of client devices to use the result of the updated malware scan instead of each performing an additional malware scan that is at least partially redundant to the updated malware scan performed on the copies of the files, wherein sharing the result of the updated malware scan with at least the subset of the client devices comprises sharing, with each client device in the subset, a subset of the result of the updated malware scan that excludes results for files not on the client device;
- a forwarding module, stored in memory, that forwards the security update to the subset of client devices from which the security update was withheld after performing the updated malware scan in response to sharing the result of the updated malware scan;
- at least one processor configured to execute the identification module, the obtainment module, the security module, the sharing module, and the forwarding module.

15. The system of claim 14, wherein the identification module obtains a set of client-side lists that identify the files stored on the client devices within the network.

16. The system of claim 15, wherein the obtainment module:
- determines that the server has not yet obtained a copy of a file stored on at least one client device within the set of client devices based at least in part on at least one client-side list within the set of client-side lists;
- obtains the copy of the file in response to determining that the server has not yet obtained the copy of the file.

17. The system of claim 16, wherein the obtainment module obtains the copy of the file from the client device storing the file.

18. The system of claim 16, wherein the obtainment module obtains the copy of the file from a backup server that has backed up the client device storing the file.

19. A non-transitory computer-readable-storage medium comprising one or more computer-executable instructions that, when executed by at least one processor of a computing device, cause the computing device to:
- identify a set of files stored on a set of client devices within a network;
- obtain, at a server, a set of copies of the files stored on the client devices within the network;
- upon obtaining the copies of the files stored on the client devices:
- perform a malware scan on the copies of the files using at least one malware definition;
- obtain a security update that comprises at least one additional malware definition;
- perform an updated malware scan to determine a malware status of each file in the set of files by scanning the copies of the files with the additional malware definition while withholding the security update from at least a subset of the client devices within the network until the server has finished performing the updated malware scan;
- generate a result of the updated malware scan performed on the copies of the files;
- share the result of the updated malware scan with at least the subset of the client devices within the network to enable the subset of client devices to use the result of the updated malware scan instead of each performing an additional malware scan that is at least partially redundant to the updated malware scan performed on the copies of the files, wherein sharing the result of the updated malware scan with at least the subset of the client devices comprises sharing, with each client device in the subset, a subset of the result of the updated malware scan that excludes results for files not on the client device;
- forward the security update to the subset of client devices from which the security update was withheld after performing the updated malware scan.

* * * * *